(12) United States Patent
Hahn et al.

(10) Patent No.: US 11,234,145 B2
(45) Date of Patent: Jan. 25, 2022

(54) METHOD AND APPARATUS FOR BEAM MANAGEMENT IN COMMUNICATION SYSTEM SUPPORTING VEHICLE-TO-EVERYTHING COMMUNICATION

(71) Applicants: Hyundai Motor Company, Seoul (KR); Kia Motors Corporation, Seoul (KR); Industry-Academic Cooperation Foundation, Dankook University, Gyeonggi-do (KR)

(72) Inventors: Gene Beck Hahn, Gyeonggi-do (KR); Su Han Choi, Gyeonggi-do (KR)

(73) Assignees: Hyundai Motor Company, Seoul (KR); Kia Motors Corporation, Seoul (KR); Industry-Academic Cooperation Foundation, Dankook University, Gyeonggi-do (KR)

( * ) Notice: Subject to any disclaimer, the term of this patent is extended or adjusted under 35 U.S.C. 154(b) by 2 days.

(21) Appl. No.: 16/669,100

(22) Filed: Oct. 30, 2019

(65) Prior Publication Data

US 2020/0145855 A1 May 7, 2020

Related U.S. Application Data

(60) Provisional application No. 62/754,236, filed on Nov. 1, 2018.

(30) Foreign Application Priority Data

Oct. 22, 2019 (KR) .................. 10-2019-0131675

(51) Int. Cl.
*H04W 24/08* (2009.01)
*H04W 4/40* (2018.01)
*H04B 7/06* (2006.01)

(52) U.S. Cl.
CPC .......... *H04W 24/08* (2013.01); *H04B 7/0617* (2013.01); *H04W 4/40* (2018.02)

(58) Field of Classification Search
CPC ..... H04W 24/08; H04W 4/40; H04W 52/146; H04W 52/242; H04L 5/0048; H04B 7/0617
See application file for complete search history.

(56) References Cited

U.S. PATENT DOCUMENTS 9,882,689 B2 * 1/2018 Yu .......................... H04B 7/024
2017/0289864 A1 10/2017 Narasimha et al.
(Continued)

FOREIGN PATENT DOCUMENTS

WO 2018/064179 A1 4/2018

*Primary Examiner* — Wei Zhao
(74) *Attorney, Agent, or Firm* — Mintz Levin Cohn Ferris Glovsky and Popeo, P.C.; Peter F. Corless

(57) ABSTRACT

An operation method of a PM participating in platooning in a communication system is provided. The method includes receiving, from a PL participating in the platooning, information regarding beam configuration between the PL and a base station and determining a beam reception range based on a first receiving direction of the PL. The first receiving direction is indicated by the information regarding beam configuration. The method further includes measuring a signal quality of a first transmission beam of the base station by changing a receiving direction of the PM within the beam reception range and determining a receiving direction in which the first transmission beam has a best signal quality as a final receiving direction.

20 Claims, 9 Drawing Sheets

(56) References Cited

U.S. PATENT DOCUMENTS

2020/0145079 A1\* 5/2020 Marinier .............. H04B 7/0456
2020/0404593 A1\* 12/2020 Yao ..................... H04W 52/325

\* cited by examiner

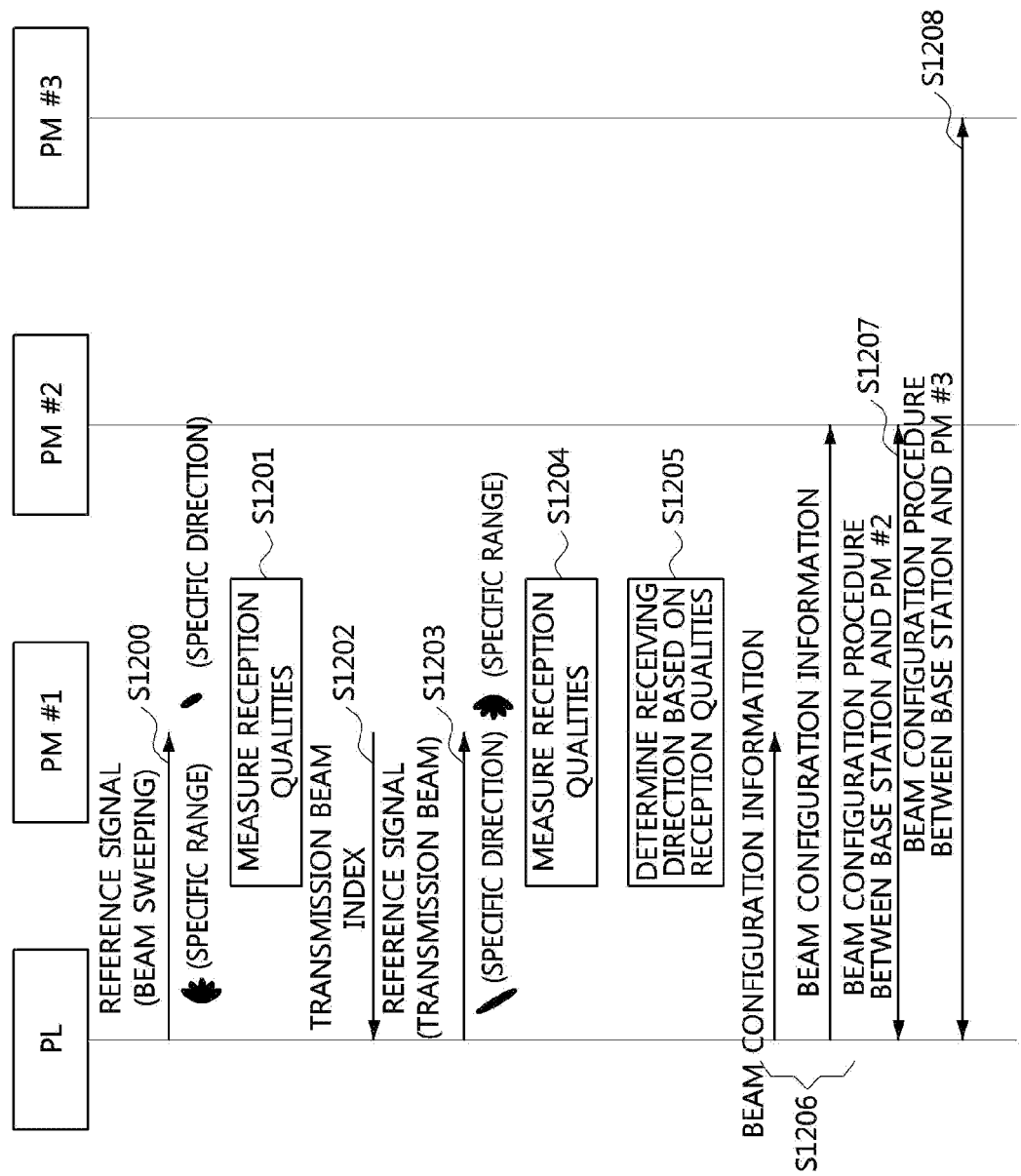

METHOD AND APPARATUS FOR BEAM MANAGEMENT IN COMMUNICATION SYSTEM SUPPORTING VEHICLE-TO-EVERYTHING COMMUNICATION

CROSS-REFERENCE TO RELATED APPLICATIONS

This application claims the benefit of priority to U.S. Provisional Patent Application No. 62/754,236, filed on Nov. 1, 2018 in the U.S. Patent and Trademark Office, and Korean Patent Application No. 10-2019-0131675, filed on Oct. 22, 2019 in the Korean Intellectual Property Office (KIPO), the entire contents of which are incorporated herein by reference.

BACKGROUND

1. Technical Field

The present disclosure relates generally to beam management techniques, and more specifically, to techniques for beam management in a communication system supporting vehicle-to-everything (V2X) communications.

2. Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system is capable of supporting Enhanced Mobile Broadband (eMBB) communications, Ultra-Reliable and Low-Latency communications (URLLC), massive Machine Type Communications (mMTC), and the like.

The 4G communication system and 5G communication system are capable of supporting Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels.

Meanwhile, vehicles (e.g., communication nodes located in the vehicles) that participate in platooning may communicate with a base station (e.g., a road side unit (RSU)). Additionally, sidelink communications may be performed between the vehicles participating in the platooning. In a platooning scenario, the vehicles may communicate in a beamforming manner. Particularly, a method for managing beams between the vehicle participating in the platooning and the base station, and a method for managing beams between the vehicles participating in the platooning are needed.

SUMMARY

Accordingly, the present disclosure provides an apparatus and a method performing beam management for platooning in a communication system supporting V2X communications.

According to exemplary embodiments of the present disclosure, an operation method of a platoon member (PM) participating in platooning may include receiving, from a platooning leader (PL) participating in the platooning, information regarding beam configuration between the PL and a base station; determining a beam reception range based on a first receiving direction of the PL, the first receiving direction being indicated by the information regarding beam configuration; measuring a signal quality of a first transmission beam of the base station by changing a receiving direction of the PM within the beam reception range, the first transmission beam being indicated by the information regarding beam configuration; and determining a receiving direction in which the first transmission beam has a best signal quality as a final receiving direction.

The information regarding beam configuration may include information that indicates the first transmission beam of the base station, information that indicates the first receiving direction of the PL, and an identifier of a cell to which the PL belongs. When a cell to which the PM belongs is equal to a cell to which the PL belongs, the information regarding beam configuration may be used for beam configuration between the PM and the base station.

When a link quality between the PM and the PL or a link quality between the PM and the base station is better than or equal to a first threshold, the information regarding beam configuration may be used for beam configuration between the PM and the base station.

When a speed of the PM is less than or equal to a second threshold, the information regarding beam configuration may be used for beam configuration between the PM and the base station. The information regarding beam configuration may be received through a medium access control (MAC) control element (CE) or sidelink control information (SCI).

The operation method may further include transmitting information that indicates the final receiving direction to the base station; and performing communication with the base station based on the first transmission beam and the final receiving direction. Furthermore, in accordance with exemplary embodiments of the present disclosure, an operation method of a platoon member (PM) participating in platooning may include receiving, from a platoon leader (PL) participating in the platooning, information regarding beam configuration between the PL and a base station; measuring signal qualities of a plurality of transmission beams of the base station within a beam transmission range determined based on a first transmission beam of the base station in a first receiving direction of the PL, the first transmission beam and the first receiving direction being indicated by the information regarding beam configuration; and determining a transmission beam having a best signal quality among the plurality of transmission beams as a final transmission beam.

The information regarding beam configuration may include information that indicates the first transmission beam of the base station, information that indicates the first receiving direction of the PL, and an identifier of a cell to which the PL belongs. The information regarding beam configuration may be used for beam configuration between the PM and the base station when at least one of a condition that a cell to which the PM belongs is equal to a cell to which the PL belongs, a condition that a link quality between the PM and the PL is not less than a first threshold, a condition that a link quality between the PM and the base station is higher than a second threshold, and a condition that a speed of the PM is equal to or less than a third threshold is satisfied. The operation method may further include transmitting information indicating the final transmission beam to the base station; and communicating with the base station based on the final transmission beam and the first receiving direction.

Furthermore, in accordance with exemplary embodiments of the present disclosure, an operation method of a first platoon member (PM) participating in platooning may include receiving, from a platoon leader (PL) participating in the platooning, information regarding beam configuration between the PL and a second PM; determining a beam reception range based on a first receiving direction of the second PM, the first receiving direction being indicated by the information on beam configuration; measuring s signal quality of a first transmission beam of the PL by changing a receiving direction of the first PM within the beam reception range, the first transmission beam being indicated by the information regarding beam configuration; and determining a receiving direction in which the first transmission beam has a best signal quality as a final receiving direction. The second PM may be located after the PL, and the first PM may be located after the second PM.

The information regarding beam configuration may include information that indicates the first transmission beam of the PL, information that indicates the first receiving direction of the second PM, and an identifier of a cell to which the PL belongs. The information regarding beam configuration may be used for beam configuration between the first PM and the PL when at least one of a condition that a cell to which the first PM belongs is equal to a cell to which the PL belongs, a condition that a link quality between the first PM and the PL is higher than a first threshold, a condition that a link quality between the first PM and the second PM is higher than a second threshold, and a condition that a speed of the first PM is equal to or less than a third threshold is satisfied.

The operation method may further include transmitting information that indicates the final receiving direction to the PL; and performing communication with the PL based on the final receiving direction and the first transmission beam. The operation method may further include transmitting a reference signal to a third PM located after the first PM using a transmission beam equal to the first transmission beam; receiving, from the third PM, information that indicates a final receiving direction of the third PM determined based on the reference signal; and communicating with the third PM based on the first transmission beam and the final receiving direction of the third PM.

Additionally, the operation method may include determining a beam transmission range based on the first transmission beam; transmitting a reference signal to a third PM located after the first PM using a plurality of beams within the beam transmission range; receiving, from the third PM, information that indicates a final transmission beam determined based on the reference signal; and communicating with the third PM based on the final transmission beam and the first receiving direction.

Furthermore, in accordance with exemplary embodiments of the present disclosure, an operation method of a first platoon member (PM) participating in platooning may include receiving, from a platoon leader (PL) participating in the platooning, information regarding beam configuration between the PL and a second PM; measuring signal qualities of a plurality of transmission beams of the PL within a beam transmission range determined based on a first transmission beam of the PL in a receiving direction equal to a first receiving direction of the second PM, the first transmission beam and the first receiving direction being indicated by the information regarding beam configuration; and determining a transmission beam having a best signal quality among the plurality of transmission beams as a final transmission beam. The second PM may be located after the PL, and the first PM may be located after the second PM.

The operation method may further include transmitting a reference signal to a third PM located after the first PM using a transmission beam equal to the first transmission beam; receiving, from the third PM, information that indicates a final receiving direction of the third PM determined based on the reference signal; and communicating with the third PM based on the first transmission beam and the final receiving direction of the third PM. The operation method may further include determining a beam transmission range based on the first transmission beam; transmitting a reference signal to a third PM located after the first PM using a plurality of beams within the beam transmission range; receiving, from the third PM, information that indicates a final transmission beam determined based on the reference signal; and communicating with the third PM based on the final transmission beam and the first receiving direction.

According to the exemplary embodiments of the present disclosure, a platoon member (PM) participating in a platooning may use beam configuration information (e.g., information regarding a pair of transmission beam and reception beam) between a base station and a platoon leader (PL) to perform a beam management procedure (e.g., beam configuration procedure) with the base station. For example, the PM may be configured to communicate with the base station using the transmission beam and reception beam configured between the base station and the PL. Alternatively, the PM may be configured to perform a beam management procedure using beams within a specific range determined based on the pair of transmission beam and reception beam configured between the base station and the PL.

Additionally, a first PM may be configured to perform a beam management procedure with the PL using beam configuration information between the PL and a second PM (e.g., the PM located after the PL). For example, the first PM may be configured to communicate with the PL using information regarding the transmission beam and reception beam configured between the PL and the second PM. Alternatively, the first PM may be configured to perform a beam management procedure using beams within a specific range determined based on the transmission beam and reception beam configured between the PL and the second PM.

Therefore, a range within which the beam management procedure is performed may be limited to the specific range instead of the entire range, thereby improving the efficiency of the beam management procedure. As a result, the performance of the communication system may be improved.

BRIEF DESCRIPTION OF DRAWINGS

Exemplary embodiments of the present disclosure will become more apparent by describing in detail exemplary embodiments of the present disclosure with reference to the accompanying drawings, in which:

FIG. 12 is a sequence chart illustrating a beam management method in a communication system supporting V2X communications according to another exemplary embodiment of the present disclosure.

Figure 1:
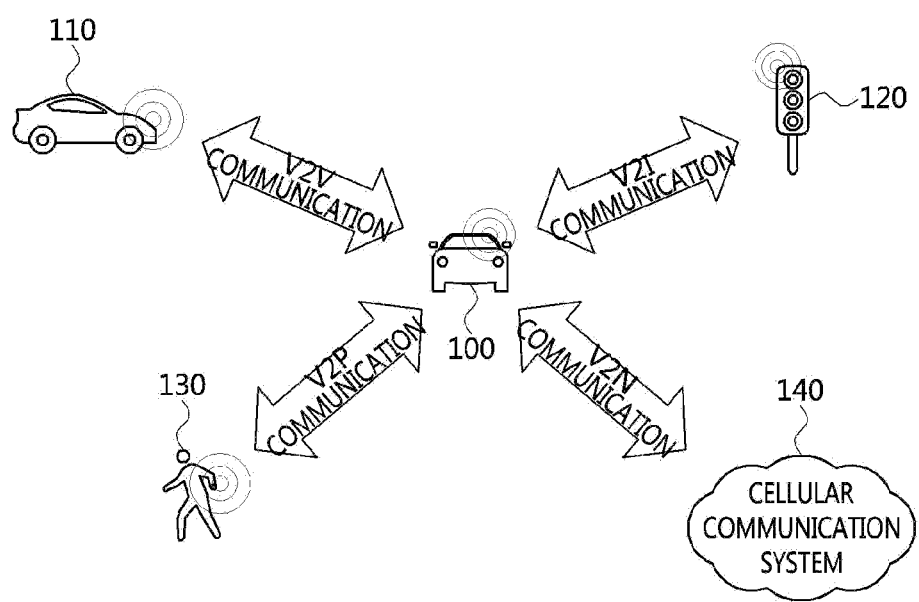
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes will be determined in part by the particular intended application and use environment.

DETAILED DESCRIPTION

Embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or controller may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." In particular, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located in the vehicle 100 or the communication node carried by the person 130 may be configured to generate an alarm that indicates a danger or risk by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located within the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
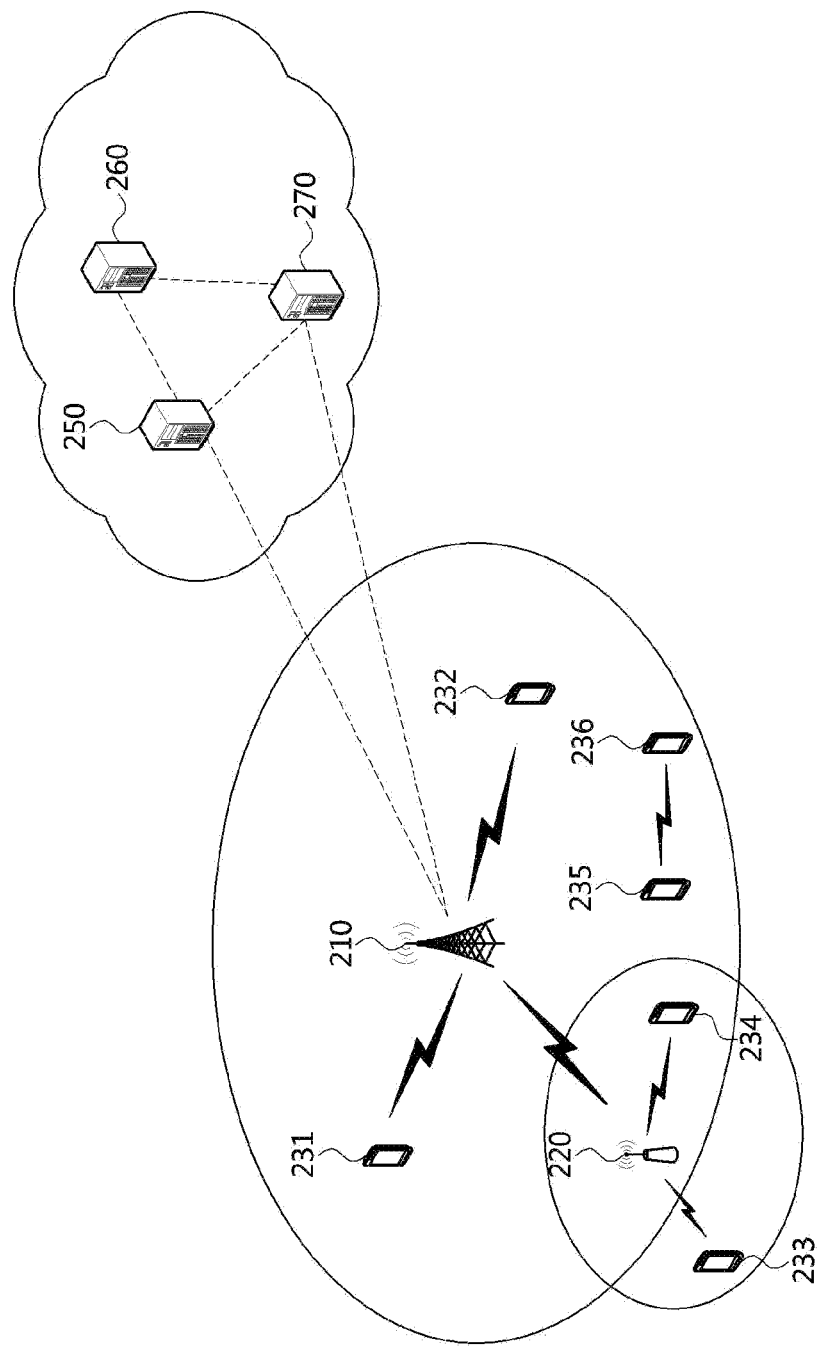
FIG. 2 is a conceptual diagram illustrating a cellular communication system according to an exemplary embodiment of the present disclosure.

FIG. 2 is a conceptual diagram illustrating an exemplary embodiment of a cellular communication system. As shown in FIG. 2, a cellular communication system may include an access network, a core network, and the like. The access network may include a base station 210, a relay 220, User Equipment (UEs) 231 through 236, and the like. The UEs 231 through 236 may include communication nodes located within the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) of the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier PUMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

Figure 3:
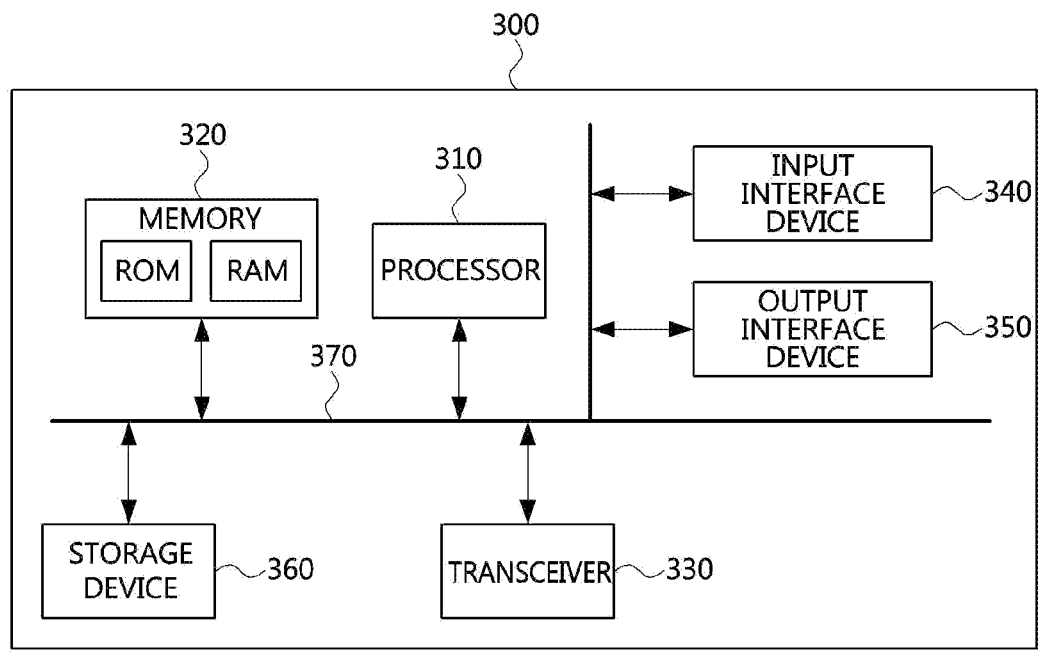
FIG. 3 is a conceptual diagram illustrating a communication node of a cellular communication system according to an exemplary embodiment of the present disclosure.

The communication nodes (e.g., base station, relay, UE, S-GW, P-GW, MME, UPF, SMF, AMF, etc.) of the cellular communication system may be configured as follows. FIG. 3 is a conceptual diagram illustrating an exemplary embodiment of a communication node constituting a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and may be configured to transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations that correspond to the base station 210 and operations supported by the base station 210. The UEs 233 and 234 may be configured to perform operations that correspond to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located within the first vehicle 100 of FIG. 1 and the UE 236 may be the communication node located within the second vehicle 110 of FIG. 1. When V2I communications are performed using the sidelink communication technique, the UE 235 may be the communication node located within first vehicle 100 of FIG. 1 and the UE 236 may be the communication node located within the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Figure 4:
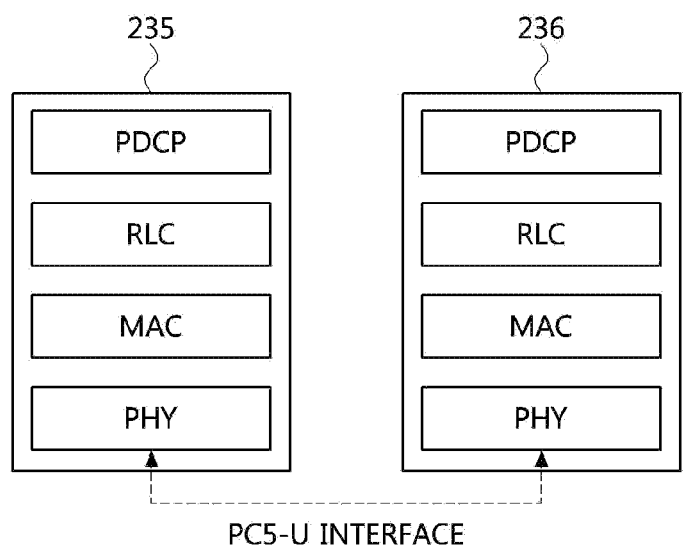
FIG. 4 is a block diagram illustrating a user plane protocol stack of an UE performing sidelink communication according to an exemplary embodiment of the present disclosure.

Meanwhile, a user plane protocol stack of the UEs (e.g., the UEs 235 and 236) performing sidelink communications may be configured as follows. FIG. 4 is a block diagram illustrating an exemplary embodiment of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported.

Figure 5:
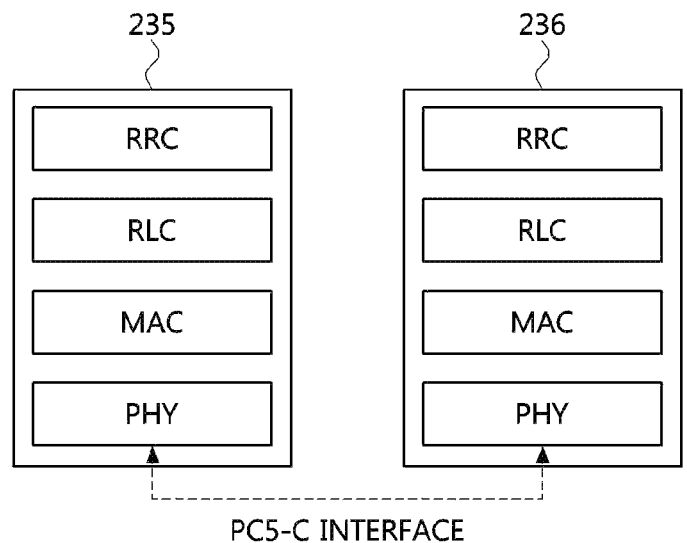
FIG. 5 is a block diagram illustrating a control plane protocol stack of an UE performing sidelink communication according to an exemplary embodiment of the present disclosure.

Meanwhile, a control plane protocol stack of the UEs (e.g., the UEs 235 and 236) performing sidelink communications may be configured as follows. FIG. 5 is a block diagram illustrating a first exemplary embodiment of a control plane protocol stack of an UE configured to perform sidelink communication, and FIG. 6 is a block diagram illustrating a second exemplary embodiment of a control plane protocol stack of an UE configured to perform sidelink communication.

Figure 6:
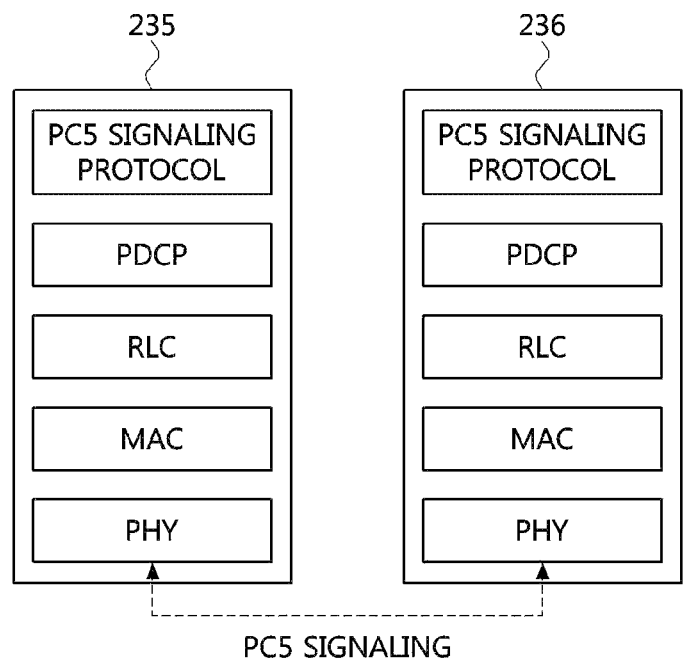
FIG. 6 is a block diagram illustrating a control plane protocol stack of an UE performing sidelink communication according to another exemplary embodiment of the present disclosure.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). In addition, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data. The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure.

In particular, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. The sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. The sidelink data may be transmitted and received through resources selected autonomously by the UE (e.g., UE 235 or 236) within the resource pool configured by the dedicated RRC signaling procedure or the broadcast RRC signaling procedure.

Hereinafter, methods according to exemplary embodiments of the present disclosure will be described. Even when a method (e.g., transmission or reception of a signal) to be performed at a first communication node among communication nodes is described, a corresponding second communication node may perform a method (e.g., reception or transmission of the signal) that corresponds to the method performed at the first communication node. In other words, when an operation of the vehicle 100 is described, the corresponding vehicle 110 may be configured to perform an operation that corresponds to the operation of the vehicle 100. Conversely, when an operation of the vehicle 110 is described, the corresponding vehicle 100 may be configured to perform an operation that corresponds to the operation of the vehicle 110. In the exemplary embodiments described below, the operation of the vehicle may be the operation of the communication node located within the vehicle.

Figure 7:
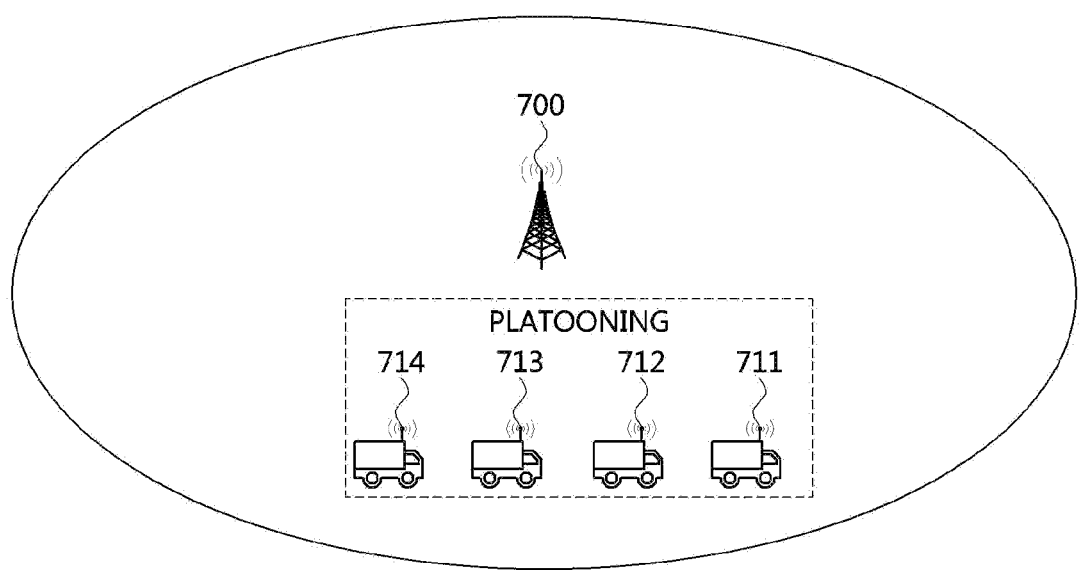
FIG. 7 is a conceptual diagram illustrating a platooning scenario in a communication system supporting V2X communications according to an exemplary embodiment of the present disclosure.

FIG. 7 is a conceptual diagram illustrating a platooning scenario in a communication system supporting V2X communications. As shown in FIG. 7, a plurality of vehicles 711 to 714 may participate in a platooning. A first vehicle (e.g., a UE located in the vehicle) among the plurality of vehicles 711 to 714 participating in the platooning may be referred to as a 'platoon leader (PL)'. For example, the leading vehicle 711 (e.g., a UE located in the vehicle 711) among the plurality of vehicles 711 to 714 participating in the platooning may be referred to as a PL. The PL 711 may be configured to lead the platooning and operate other vehicles 712 to 714. Among the plurality of vehicles 711 to 714 participating in the platooning, the remaining vehicles 712 to 714 (e.g., UEs located in the vehicles) except the vehicle 711 (e.g., PL vehicle) may be referred to as 'platform members (PMs)'. Alternatively, the last vehicle 714 of the plurality of vehicles 711 to 714 participating in the platooning may be referred to as a 'platooning tail (PT)'. The PMs 712 to 714 may operate under the operation of the PL 711.

When the PL 711 is the UE 235 shown in FIG. 2, each of the PMs 712 to 714 may be the UE 236 shown in FIG. 2. Each of the PL 711, the PM 712, the PM 713, and the PM 714 may be configured identically or similarly to the communication node 300 shown in FIG. 3. For example, each of the PL 711, the PM 712, the PM 713, and the PM 714 may include an antenna array that includes a plurality of antenna elements. Each of the PL 711, the PM 712, the PM 713, and the PM 714 may support the protocol stacks shown in FIGS. 4 to 6.

Each of the PL 711, the PM 712, the PM 713, and the PM 714 participating in the platooning may be connected with a base station 700 (e.g., RSU), and may be configured to communicate with the base station 700 in a beamforming manner. In particular, a pair of 'transmission beam and reception beam' may be disposed between the base station 700 and each of the PL 711, the PM 712, the PM 713, and the PM 714, and beamforming based communications may be performed using the pair of 'transmission beam and reception beam'. The reception beam may correspond to a receiving direction.

In addition, sidelink communications may be performed among the PL 711, the PM 712, the PM 713, and the PM 714 participating in the platooning, and the sidelink communications may also be performed in a beamforming manner. In particular, a pair of 'transmission beam and reception beam' may be configured between the PL 711 and each of the PM 712, the PM 713, and the PM 714, and beamforming based communications may be performed using the pair of 'transmission beam and reception beam'. The pair of transmission beam and reception beam may be configured through a beam management procedure (e.g., beam configuration procedure or beam setup procedure), and in a scenario for the platooning, the beam management procedure may be performed as follows.

Figure 8:
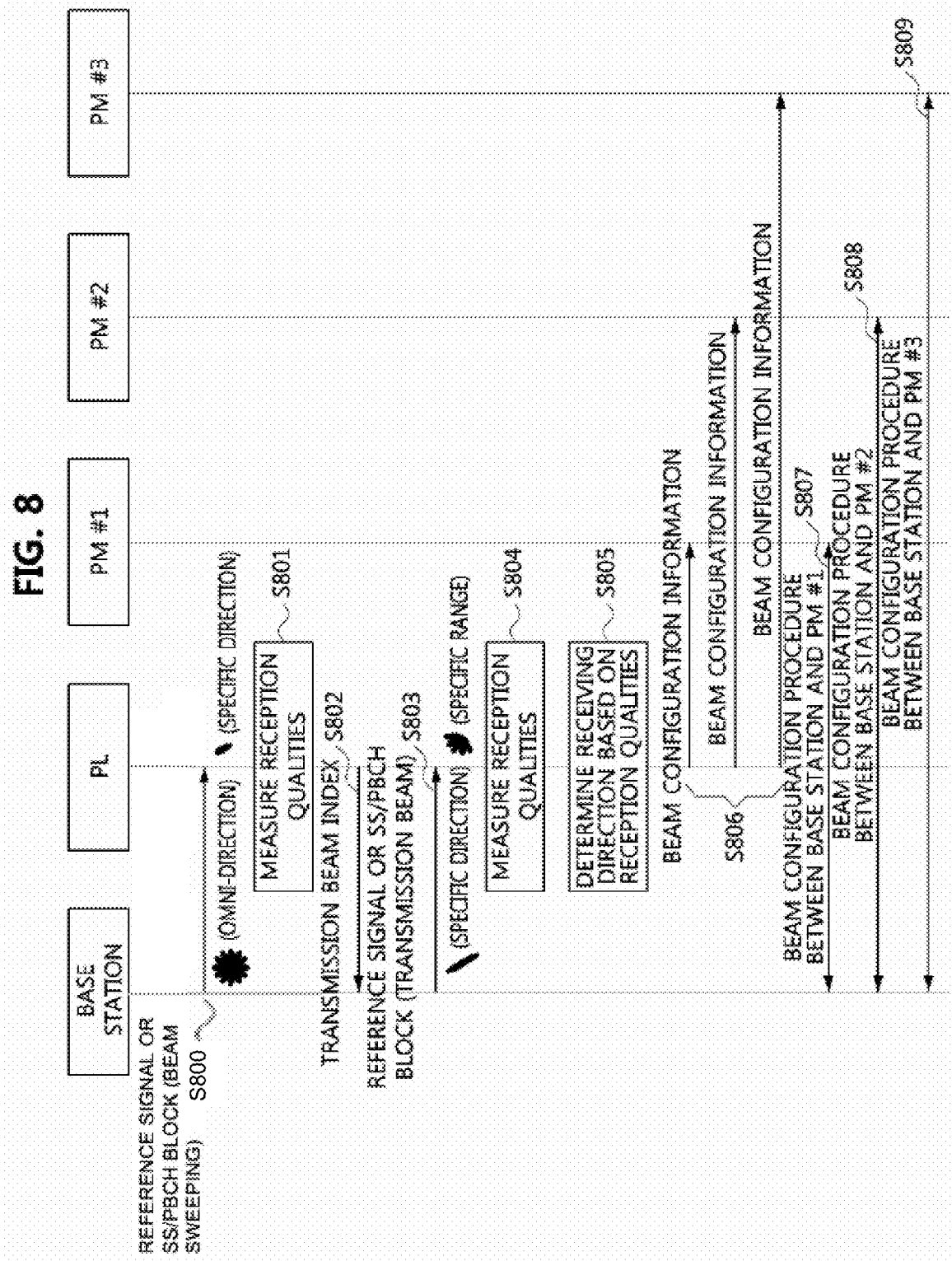
FIG. 8 is a sequence chart illustrating a beam management method in a communication system supporting V2X communications according to an exemplary embodiment of the present disclosure.

FIG. 8 is a sequence chart illustrating a first exemplary embodiment of a beam management method in a communication system supporting V2X communications. As shown in FIG. 8, a communication system may include a base station, a PL, a first PM, a second PM, and a third PM. The base station may be the base station 700 shown in FIG. 7, and the PL may be the PL 711 shown in FIG. 7. The first PM may be the PM 712 shown in FIG. 7, the second PM may be the PM 713 shown in FIG. 7, and the third PM may be the PM 714 shown in FIG. 7. 714. Additionally, the third PM may be a PT.

Furthermore, the base station may be configured to transmit a reference signal (e.g., a channel state information-reference signal (CSI-RS)) or a synchronization signal/physical broadcast channel (SS/PBCH) block in a beam sweeping manner (S800). In the step S800, the reference signal or the SS/PBCH block may be transmitted in an omnidirectional manner. Alternatively, in the step S800, the reference signal or the SS/PBCH block may be transmitted in a specific direction instead of the omnidirectional manner.

The PL may be configured to receive the reference signal or the SS/PBCH block from the base station, and measure a quality (e.g., received signal strength) of the received reference signal or SS/PBCH block (S801). The PL may be configured to transmit information that indicates an index of a beam (e.g., transmission beam index) on which a reference signal or an SS/PBCH block having the best quality to the base station (S802). The base station may be configured to transmit a reference signal or an SS/PBCH block using the transmission beam indicated by the information received from the PL (S803). In the step S803, the reference signal or the SS/PBCH block may be repeatedly transmitted through the same transmission beam.

The PL may be configured to receive the reference signal or the SS/PBCH block in a beam sweeping manner. For example, the PL may be configured to receive the reference signal or the SS/PBCH block in each of a plurality of receiving directions by adjusting a receiving direction thereof, and may be configured to measure qualities (e.g., received signal strength) of the received reference signals or SS/PBCH blocks (S804). Among the plurality of receiving directions, the PL may be configured to determine a receiving direction in which a reference signal or SS/PBCH block having the best quality is received as a final receiving direction (e.g., reception beam) (S805). The PL may be configured to inform (e.g., provide a notification to) the base station of the receiving direction (e.g., reception beam) determined in the step S805. By performing the steps S800 to S805, a pair of transmission beam and reception beam (e.g., receiving direction) may be configured between the base station and the PL.

The PL may be configured to transmit information regarding the beam configuration (i.e., beam configuration information) to the PMs participating in the platooning (S806). The beam configuration information may be transmitted via a MAC control element (CE) and/or sidelink control information (SCI). Alternatively, when the PL informs the base station of the information regarding the reception beam (e.g., receiving direction) determined in the step S805, the base station may be configured to transmit the beam configuration information to the PMs participating in the platooning. In particular, the beam configuration information may be transmitted via system information, an RRC message, a MAC CE, and/or downlink control information (DCI). The beam configuration information may include one or more among information elements defined in Table 3 below.

TABLE 3

| Information element | Description |
| --- | --- |
| Transmission beam index | Transmission beam index of the base station, which is determined in the steps S800 to S802 |
| Receiving direction (e.g., reception beam index) | Receiving direction of the PL, which is determined in the step S805 |
| Beam transmission range | Range within which a plurality of beams are transmitted |
| Beam reception range | Range within which a plurality of receiving directions are present |
| Cell ID | Identifier (ID) of a cell to which the PL belongs (e.g., physical layer ID) |
| Position information | Information on a position of the PL (e.g., the position of the PL, which is obtained by GPS). |

The beam transmission range may be determined based on the transmission beam determined in the steps S800 to S802. A plurality of beams may be transmitted in the beam sweeping manner within the beam transmission range, and the transmission beam determined in the steps S800 to S802 may be included in the plurality of beams. The beam reception range may be determined based on the receiving direction determined in the step S805. There may be a plurality of receiving directions within the beam reception range, and the receiving direction determined in the step S805 may be included in the plurality of receiving directions.

When the beam configuration information includes the position information, the PM may efficiently configure beams using the position information as well as information regarding the pair of transmission beam and reception indicated by the beam configuration information. In other words, since a movement path of the PM is the same as a movement path of the PL, if the PM has the information regarding the pair of transmission beam and reception beam of the PL and the position information of the PL, and antenna configuration of the PM is the same as that of the PL, the PM may use the transmission beam and reception beam indicated by the beam configuration information without performing a separate beam management procedure (e.g., beam configuration procedure).

On the other hand, when a cell to which the PM belongs is different from a cell to which the PL belongs, the information regarding the pair of transmission beam and reception beam indicated by the beam configuration information may not be helpful in the beam management procedure performed in the PM. Therefore, in the beam management procedure, the PM may consider the cell ID indicated by the beam configuration information.

The first PM may be configured to receive the beam configuration information from the PL or the base station. The first PM may configure a pair of transmission beam and reception beam between the base station and the first PM based on the beam configuration information (S807). The second PM may be configured to receive the beam configuration information from the PL or the base station. The second PM may configure a pair of transmission beam and reception beam between the base station and the second PM based on the beam configuration information (S808). The third PM may be configured to receive the beam configuration information from the PL or the base station. The third PM may configure a pair of transmission beam and reception beam between the base station and the third PM based on the beam configuration information (S809). Each of the steps S807, S808, and S809 may be performed in at least one of two schemes below.

Scheme #1

Each of the PMs may be configured to perform communications using the transmission beam and reception beam indicated by the beam configuration information received from the PL or the base station, when at least one of conditions defined in Table 4 below is satisfied. In other words, a separate procedure for configuring the transmission beam and reception beam may not be performed. In Table 4 below, a link quality may be a bit error rate (BER), a block error rate (BLER), a reference signal received power (RSRP), a reference signal received quality (RSRQ), and/or a channel quality indicator (CQI). In Table 4 below, a threshold may be determined by the base station or the PL. When the threshold is determined by the base station, the base station may be configured to inform or output a notification to the PMs of the threshold using system information, an RRC message, a MAC CE, and/or DCI. When the threshold is determined by the PL, the PL may be configured to inform or output a notification to the PMs of the threshold using a MAC CE and/or SCI.

TABLE 4

| Condition | Description |
| --- | --- |
| 1 | When a link quality between PM or PL or a link quality between PM and base station is equal to or greater than a threshold (i.e., link quality threshold) |
| 2 | When a speed of PL or PM is equal to or less than a threshold (i.e., speed threshold) |
| 3 | When an ID of a cell to which PM belongs is the same as an ID of a cell to which PL belongs |

For example, the transmission beam and reception beam between the base station and the first PM may be configured to the transmission beam and reception beam indicated by the beam configuration information obtained in the step S806. The transmission beam and reception beam between the base station and the second PM may be configured to the transmission beam and reception beam indicated by the beam configuration information obtained in the step S806. The transmission beam and reception beam between the base station and the third PM may be configured to the transmission beam and reception beam indicated by the beam configuration information obtained in the step S806.

Scheme #2

When one or more of the conditions defined in Table 4 are not satisfied, the transmission beam and reception beam between the base station and the PM may be configured based on the scheme #2 instead of the scheme #1. Alternatively, even when one or more of the conditions defined in Table 4 are satisfied, the transmission beam and reception beam between the base station and the PM may be configured based on the scheme #2. In particular, the thresholds of Table 4 used to determine whether to perform the scheme #2 may be different from the thresholds of Table 4 used to determine whether to perform the scheme #1. For example, the link quality threshold for the scheme #2 may be lower than the link quality threshold for the scheme #1. The speed threshold for the scheme #2 may be greater than the speed threshold for the scheme #1.

The scheme #2 may be classified into a detailed scheme #1, a detailed scheme #2, and a detailed scheme #3. In the detailed scheme #1, the transmission beam between the base station and the PM may be fixed to the transmission beam indicated by the beam configuration information, and the reception beam between the base station and the PM may be refined. In the detailed scheme #2, the reception beam between the base station and the PM may be fixed to the reception beam indicated by the beam configuration information, and the transmission beam between the base station and the PM may be refined. In the detailed scheme #3, the transmission beam and the reception beam between the base station and the PM may be refined based on the beam configuration information.

Figure 9:
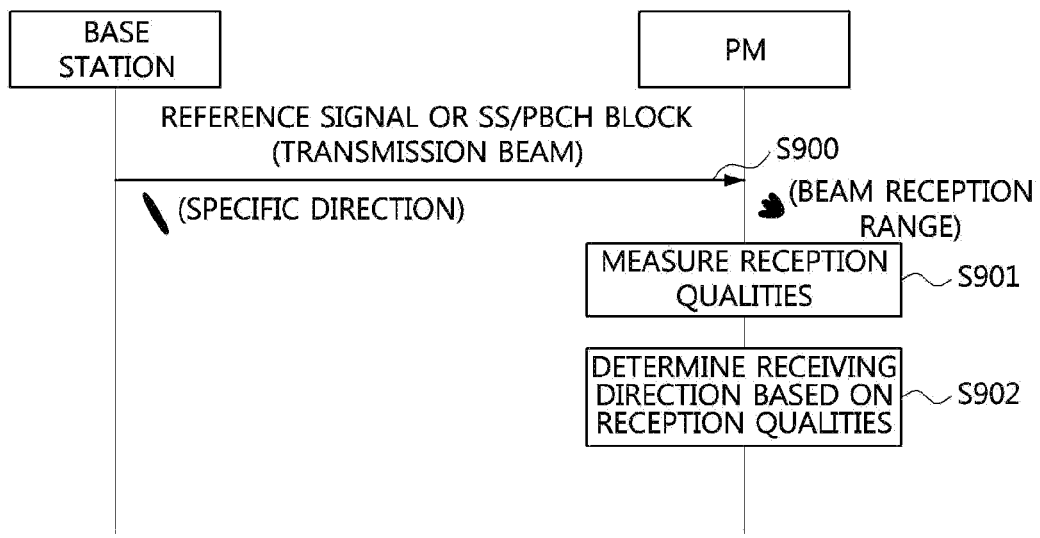
FIG. 9 is a sequence chart illustrating a beam management method according to a detailed scheme #1 in a communication system supporting V2X communications according to an exemplary embodiment of the present disclosure.

FIG. 9 is a sequence chart illustrating a beam management method according to a detailed scheme #1 in a communication system supporting V2X communications. As shown in FIG. 9, a base station may be the base station shown in FIG. 8, and a PM may be one of the PMs shown in FIG. 8. The base station may be configured to transmit a reference signal or an SS/PBCH block using the transmission beam indicated by the beam configuration information of the step S806 (S900). In the step S900, the reference signal or the SS/PBCH block may be repeatedly transmitted.

The PM may be configured to receive the reference signal or the SS/PBCH block in a beam sweeping manner. For example, the PM may be configured to receive the reference signal or the SS/PBCH block in each of a plurality of receiving directions by adjusting a receiving direction thereof, and measure qualities (e.g., received signal strength) of the received reference signals or SS/PBCH blocks (S901). The PM may be configured to determine a beam reception range (e.g., a vertical range and/or a horizontal range) based on the receiving direction indicated by the beam configuration information of the step S806, and may be configured to receive the reference signal and/or the SS/PBCH block by adjusting a receiving direction thereof within the beam reception range. Alternatively, the PM may be configured to receive the reference signal or the SS/PBCH block by adjusting a receiving direction thereof within the beam reception range indicated by the beam configuration information of the step S806. In other words, the PM may be configured to receive the reference signal or the SS/PBCH block in a plurality of receiving directions.

Among the plurality of receiving directions, the PM may be configured to determine a receiving direction in which a reference signal or the SS/PBCH block having the best quality is received as a final receiving direction (e.g., reception beam) (S902). The PM may be configured to inform or output a notification to the base station of the receiving direction (e.g., reception beam) determined in the step S902. By performing the steps S900 to S902 between the base station and the PM, the transmission beam and reception beam may be configured. Particularly, the transmission beam may be the transmission beam indicated by the beam configuration information of the step S806, and the reception beam may be refined based on the reception beam indicated by the beam configuration information of the step S806.

Figure 10:
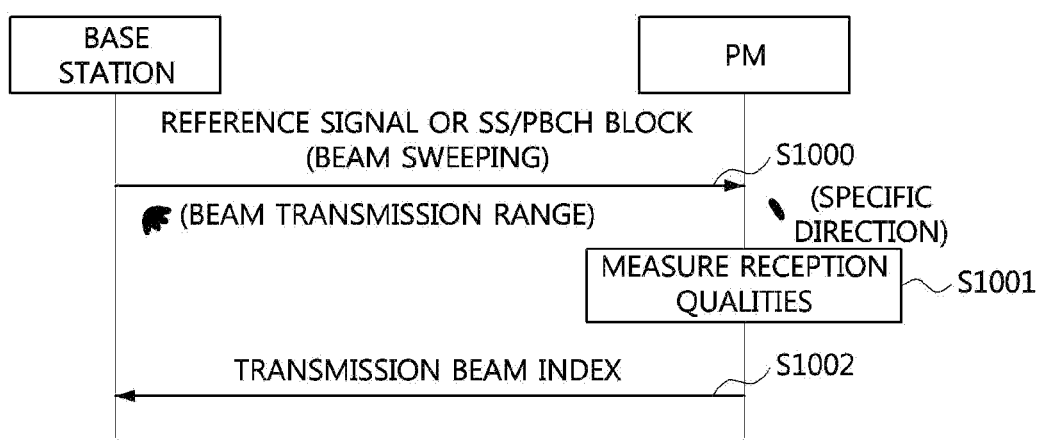
FIG. 10 is a sequence chart illustrating a beam management method according to a detailed scheme #2 in a communication system supporting V2X communications according to an exemplary embodiment of the present disclosure.

FIG. 10 is a sequence chart illustrating a beam management method according to a detailed scheme #2 in a communication system supporting V2X communications. As shown in FIG. 10, a base station may be the base station shown in FIG. 8, and a PM may be one of the PMs shown in FIG. 8. The base station may be configured to transmit the reference signal or the SS/PBCH block in a beam sweeping manner (S1000).

For example, the base station may be configured to determine a beam transmission range based on the transmission beam indicated by the beam configuration information of the step S806, and transmit the reference signal or the SS/PBCH block by performing beam sweeping within the beam transmission range. Alternatively, the base station may be configured to transmit the reference signal or the SS/PBCH block by performing beam sweeping within the beam transmission range indicated by the beam configuration information of the step S806.

The PM may be configured to receive the reference signal or the SS/PBCH block in the receiving direction indicated by the beam configuration information of the step S806, and measure the quality of the received reference signal or the SS/PBCH block (S1001). In the step S1001, the transmission beam or the beam transmission range indicated by the beam configuration information may be considered. In particular, the PM may be configured to receive the reference signal or the SS/PBCH block via a plurality of beams belonging to the beam transmission range.

The PM may be configured to transmit, to the base station, information that indicates an index of a beam (e.g., transmission beam) on which a reference signal or the SS/PBCH block having the best quality is transmitted (S1002). By performing the steps S1000 to S1002 between the base station and the PM, the transmission beam and reception beam may be configured. Particularly, the transmission beam may be refined based on the transmission beam indicated by the beam configuration information of the step S806, and the reception beam may be the reception beam indicated by the beam configuration information of the step S806.

Figure 11:
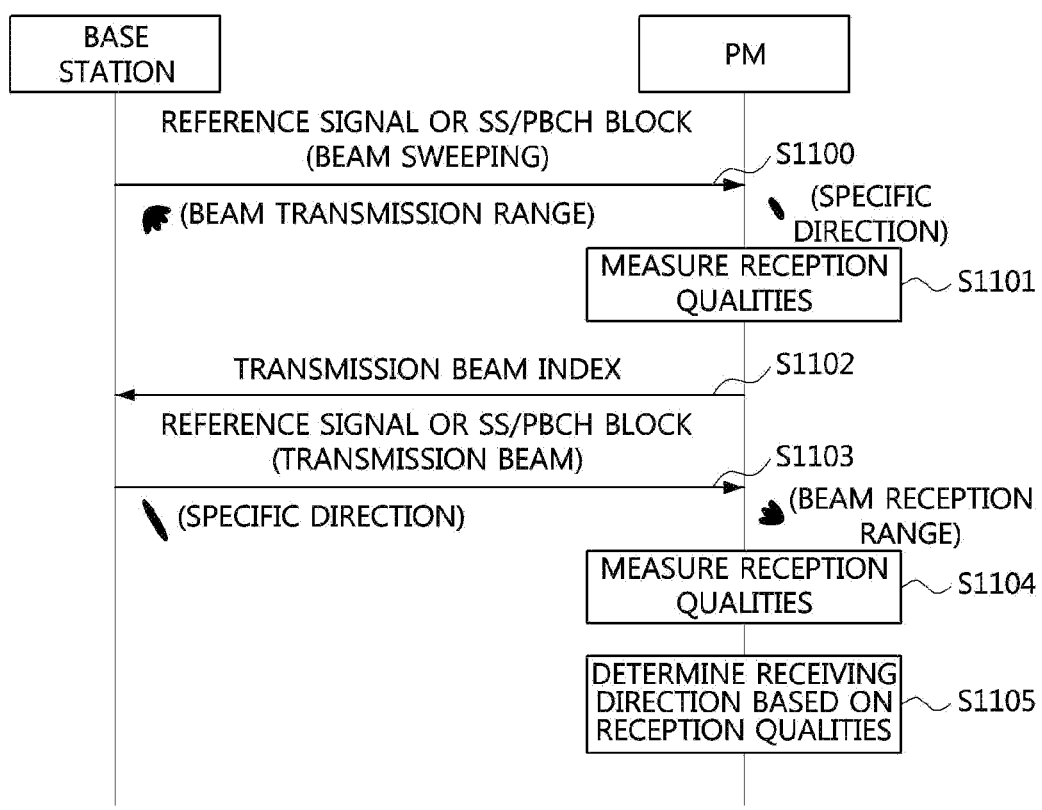
FIG. 11 is a sequence chart illustrating a beam management method according to a detailed scheme #3 in a communication system supporting V2X communication according to an exemplary embodiment of the present disclosure s.

FIG. 11 is a sequence chart illustrating a beam management method according to a detailed scheme #3 in a communication system supporting V2X communications. As shown in FIG. 11, a base station may be the base station shown in FIG. 8, and a PM may be one of the PMs shown in FIG. 8. The base station may be configured to transmit the reference signal or the SS/PBCH block in a beam sweeping manner (S1100). For example, the base station may be configured to determine a beam transmission range based on the transmission beam indicated by the beam configuration information of the step S806, and transmit the reference signal or the SS/PBCH block by performing beam sweeping within the beam transmission range. Alternatively, the base station may be configured to transmit the reference signal or the SS/PBCH block by performing beam sweeping within the beam transmission range indicated by the beam configuration information of the step S806.

The PM may be configured to receive the reference signal or the SS/PBCH block in the receiving direction indicated by the beam configuration information of the step S806, and measure the quality of the received reference signal or the SS/PBCH block (S1101). Additionally, the PM may be configured to transmit, to the base station, information that indicates an index of a beam (e.g., transmission beam) on which a reference signal or the SS/PBCH block having the best quality is transmitted (S1102). The base station may be configured to transmit the reference signal or the SS/PBCH block using the transmission beam indicated by the information received from the PM (S1103). In the step S1103, the reference signal or the SS/PBCH block may be repeatedly transmitted.

The PM may be configured to receive the reference signal or the SS/PBCH block in a beam sweeping manner. For example, the PM may be configured to receive the reference signal or the SS/PBCH block in each of a plurality of receiving directions by adjusting a receiving direction thereof, and measure qualities (e.g., received signal strength) of the received reference signals or SS/PBCH blocks (S1104).

Further, the PM may be configured to determine a beam reception range (e.g., a vertical range and/or a horizontal range) based on the receiving direction indicated by the beam configuration information of the step S806, and receive the reference signal and/or the SS/PBCH block by adjusting a receiving direction thereof within the beam reception range. Alternatively, the PM may be configured to receive the reference signal or the SS/PBCH block by adjusting a receiving direction thereof within the beam reception range indicated by the beam configuration information of the step S806. In other words, the PM may be configured to receive the reference signal or the SS/PBCH block in a plurality of receiving directions.

Among the plurality of receiving directions, the PM may be configured to determine a receiving direction in which the reference signal or the SS/PBCH block having the best quality is received as a final receiving direction (e.g., reception beam) (S1105). The PM may be configured to inform or output a notification to the base station of the receiving direction (e.g., reception beam) determined in the step S1105. By performing the steps S1100 to S1105 between the base station and the PM, the pair of transmission beam and reception beam may be configured. Particularly, the transmission beam may be refined based on the transmission beam indicated by the beam configuration information of the step S806, and the reception beam may be refined based on the reception beam indicated by the beam configuration information of the step S806.

Meanwhile, when one or more of conditions defined in Table 5 are satisfied, the scheme #1 may be more effective than the scheme #2.

TABLE 5

| Condition | Description |
|---|---|
| 1 | When vehicles participating in platooning have the same or similar antenna configurations (e.g., when types of the vehicles participating in platooning are the same) |
| 2 | When a distance between PL and each PM is relatively short |

TABLE 5-continued

| Condition | Description |
|---|---|
| 3 | When a size of a cell to which vehicles participating in platooning belong is larger than a length of the platooning |
| 4 | When a link between a base station and each PM has a line-of-sight (LOS) property |
| 5 | When a distance between a base station and each PM is equal to or greater than a threshold |
| 6 | When vehicles participating in platooning travel on a straight road |

On the other hand, when one or more of conditions defined in Table 6 are satisfied, the scheme #2 may be more effective than the scheme #1.

TABLE 6

| Condition | Description |
|---|---|
| 1 | When vehicles participating in platooning have different antenna configurations (e.g., when types of the vehicles participating in platooning are different) |
| 2 | When a distance between PL and each PM is relatively long |
| 3 | When a size of a cell to which vehicles participating in platooning belong is equal to or less than a length of the platooning |
| 4 | When a link between a base station and each PM has a non-LOS property |
| 5 | When a distance between a base station and each PM is less than a threshold |
| 6 | When vehicles participating in platooning travel on a curve road |

FIG. 12 is a sequence chart illustrating a second exemplary embodiment of a beam management method in a communication system supporting V2X communications. As shown in FIG. 12, a communication system may include a base station, a PL, a first PM, a second PM, and a third PM. The base station may be the base station 700 shown in FIG. 7, and the PL may be the PL 711 shown in FIG. 7. The first PM may be the PM 712 shown in FIG. 7, the second PM may be the PM 713 shown in FIG. 7, and the third PM may be the PM 714 shown in FIG. 7. 714.

The beam management method shown in FIG. 12 may be used to configure beams between the vehicles participating in a platooning, and the beam management method shown in FIG. 8 may be used to configure beams between the base station and each vehicle participating in the platooning. For example, after the beam management method shown in FIG. 8 is performed (e.g., after a beam configuration procedure between the base station and each vehicle (e.g., PL or PM) participating in the platooning is performed), a beam management method shown in FIG. 12 (e.g., beam configuration procedure between the PL and each PM) may be performed.

The PL may be configured to transmit a reference signal (e.g., CSI-RS) in a beam sweeping manner (S1200). In the step S1200, the reference signal may be transmitted in a beam sweeping manner within a specific range behind the PL. In other words, narrow beam sweeping may be performed instead of omnidirectional beam sweeping. The first PM may be configured to receive the reference signal from the PL, and measure a quality (e.g., received signal strength) of the received reference signal (S1201). The first PM may be configured to transmit information indicating an index of a beam (e.g., transmission beam index) on which a reference signal having the best quality is transmitted (S1202). The PL may be configured to transmit the reference signal using a transmission beam indicated by the information received from the first PM (S1203). In the step S1203, the reference signal may be repeatedly transmitted.

The first PM may be configured to receive the reference signal in a beam sweeping manner within a specific range in front of the first PM. For example, the first PM may be configured to receive the reference signal in a plurality of receiving directions by adjusting a receiving direction thereof within the specific range, and measure qualities (e.g., received signal strengths) of the received reference signals (S1204).

Among the plurality of receiving directions, the first PM may be configured to determine a receiving direction in which a reference signal having the best quality is received as a final receiving direction (e.g., reception beam) (S1205). The first PM may be configured to inform or output/transmit a notification to the PL of the receiving direction (e.g., reception beam) determined in the step S1205. By performing the steps S1200 to S1205 between the PL and the first PM, the transmission beam and reception beam may be configured.

The PL may be configured to transmit beam configuration information to the second and third PMs participating in the platooning (S1206). The beam configuration information may include one or more among the information elements defined in Table 3. The beam configuration information may be transmitted via a MAC CE and/or SCI. Alternatively, when the PL informs the base station of the transmission beam and reception beam configured in the steps S1200 to S1205, the base station may be configured to transmit the beam configuration information to the second and third PMs participating in the platooning. In particular, the beam configuration information may be transmitted via system information, an RRC message, a MAC CE, and/or DCI.

The beam configuration information may be transmitted in a broadcast scheme, a groupcast scheme, or a unicast scheme. The beam configuration information may be transmitted to the second and third PMs via the 4G communication system or the 5G communication system. For example, in the communication system, the beam configuration information may be transmitted in a sidelink communication scheme or a single cell point-to-multipoint (SC-PTM) scheme.

The second PM may be configured to receive the beam configuration information from the PL or the base station, and may configure a pair of transmission beam and reception beam between the second PM and the PL using the beam configuration information (S1207). The third PM may be configured to receive the beam configuration information from the PL or the base station, and configure a pair of transmission beam and reception beam between the third PM and the PL using the beam configuration information (S1208). Each of the steps S1207 and S1208 may be performed in at least one of two schemes.

Scheme #1

Each of the second and third PMs may be configured to perform communications using the transmission beam and reception beam indicated by the beam configuration information received from the PL or the base station when at least one of the conditions defined in Table 4 is satisfied. In other words, a separate procedure for configuring a pair of transmission beam and reception beam for each PM may not be performed.

For example, the transmission beam and reception beam between the PL and the second PM may be configured to the transmission beam and reception beam indicated by the beam configuration information obtained in the step S1206. The transmission beam and reception beam between the PL and the third PM may be configured to the transmission beam and reception beam indicated by the beam configuration information obtained in the step S1206.

Scheme #2

When one or more of the conditions defined in Table 4 are not satisfied, the transmission beam and reception beam between the base station and the PM may be configured based on the scheme #2 instead of the scheme #1. Alternatively, even when one or more of the conditions defined in Table 4 are satisfied, the transmission beam and reception beam between the base station and the PM may be configured based on the scheme #2. In particular, the thresholds of Table 4 used to determine whether to perform the scheme #2 may be different from the thresholds of Table 4 used to determine whether to perform the scheme #1. For example, the link quality threshold for the scheme #2 may be lower than the link quality threshold for the scheme #1. The speed threshold for the scheme #2 may be greater than the speed threshold for the scheme #1.

The scheme #2 may be classified into a detailed scheme #1, a detailed scheme #2, and a detailed scheme #3. In the detailed scheme #1, the transmission beam between the base station and the PM may be fixed to the transmission beam indicated by the beam configuration information, and the reception beam between the base station and the PM may be refined. For example, the detailed scheme #1 may be performed based on the exemplary embodiment shown in FIG. 9. In particular, the operation of the base station in FIG. 9 may be assumed to be an operation of the PL, and the operation of the PM in FIG. 9 may be assumed to be an operation of the second PM or the third PM.

In the detailed scheme #2, the reception beam between the base station and the PM may be fixed to the reception beam indicated by the beam configuration information, and the transmission beam between the base station and the PM may be refined. For example, the detailed scheme #2 may be performed based on the exemplary embodiment shown in FIG. 10. Particularly, the operation of the base station in FIG. 10 may be assumed to be an operation of the PL, and the operation of the PM in FIG. 10 may be assumed to be an operation of the second PM or the third PM.

In the detailed scheme #3, the transmission beam and the reception beam between the base station and the PM may be refined based on the beam configuration information. For example, the detailed scheme #3 may be performed based on the exemplary embodiment shown in FIG. 11. In particular, the operation of the base station in FIG. 11 may be assumed to be an operation of the PL, and the operation of the PM in FIG. 11 may be assumed to be an operation of the second PM or the third PM.

Meanwhile, sidelink communications may be performed between the PMs, and the sidelink communications may be performed in a beamforming manner. Accordingly, the PMs participating in the platooning may be connected in a daisy chain scheme. For example, a sidelink may be established between the first PM and the second PM, and a sidelink may be established between the second PM and the third PM. The sidelinks established between the PMs may be used to transmit a substantial amount of data at high speed. Additionally, the sidelinks established between the PMs may be used to transmit data that is not delay sensitive.

The sidelink between the first PM and the second PM may be configured using the beam configuration information determined through the steps S1200 to S1205. For example, the sidelink between the first PM and the second PM may be configured according to the scheme #1 or the scheme #2 (e.g., detailed scheme #1, #2, or #3) using the beam configuration information. The sidelink between the second PM and the third PM may be configured using the beam configuration information determined through the steps S1200 to S1205. For example, the sidelink between the second PM and the third PM may be configured according to the scheme #1 or the scheme #2 (e.g., detailed scheme #1, #2, or #3) using the beam configuration information. The beam configuration procedure between the PMs may be performed after the beam management method shown in FIG. 12 (e.g., the beam configuration procedure between the PL and each PM) is performed.

The exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a platoon member (PM) participating in platooning in a communication system, comprising:
   receiving, by a controller, from a platooning leader (PL) participating in the platooning, information regarding beam configuration between the PL and a base station;
   determining, by the controller, a beam reception range based on a first receiving direction of the PL, the first receiving direction being indicated by the information regarding beam configuration;
   measuring, by the controller, a signal quality of a first transmission beam of the base station by changing a receiving direction of the PM within the beam reception range, the first transmission beam being indicated by the information on beam configuration; and
   determining, by the controller, a receiving direction in which the first transmission beam has a best signal quality as a final receiving direction.

2. The operation method according to claim 1, wherein the information regarding beam configuration includes information that indicates the first transmission beam of the base station, information that indicates the first receiving direction of the PL, and an identifier of a cell to which the PL belongs.

3. The operation method according to claim 1, wherein when a cell to which the PM belongs is equal to a cell to which the PL belongs, the information regarding beam configuration is used for beam configuration between the PM and the base station.

4. The operation method according to claim 1, wherein when a link quality between the PM and the PL or a link quality between the PM and the base station is higher than or equal to a first threshold, the information regarding beam configuration is used for beam configuration between the PM and the base station.

5. The operation method according to claim 1, wherein when a speed of the PM is less than or equal to a second threshold, the information regarding beam configuration is used for beam configuration between the PM and the base station.

6. The operation method according to claim 1, wherein the information regarding beam configuration is received via a medium access control (MAC) control element (CE) or sidelink control information (SCI).

7. The operation method according to claim 1, further comprising:
   transmitting, by the controller, information that indicates the final receiving direction to the base station; and
   performing, by the controller, communication with the base station based on the first transmission beam and the final receiving direction.

8. An operation method of a platoon member (PM) participating in platooning in a communication system, comprising:
   receiving, by a controller, from a platoon leader (PL) participating in the platooning, information regarding beam configuration between the PL and a base station;
   measuring, by the controller, signal qualities of a plurality of transmission beams of the base station within a beam transmission range determined based on a first transmission beam of the base station in a first receiving direction of the PL, the first transmission beam and the first receiving direction being indicated by the information regarding beam configuration; and
   determining, by the controller, a transmission beam having a best signal quality among the plurality of transmission beams as a final transmission beam.

9. The operation method according to claim 8, wherein the information regarding beam configuration includes information that indicates the first transmission beam of the base station, information that indicates the first receiving direction of the PL, and an identifier of a cell to which the PL belongs.

10. The operation method according to claim 8, wherein the information regarding beam configuration is used for beam configuration between the PM and the base station when at least one of a condition that a cell to which the PM belongs is equal to a cell to which the PL belongs, a condition that a link quality between the PM and the PL is higher than a first threshold, a condition that a link quality between the PM and the base station is higher than a second threshold, and a condition that a speed of the PM is equal to or less than a third threshold is satisfied.

11. The operation method according to claim 8, further comprising:
   transmitting, by the controller, information that indicates the final transmission beam to the base station; and
   communicating, by the controller, with the base station based on the final transmission beam and the first receiving direction.

12. An operation method of a first platoon member (PM) participating in platooning in a communication system, comprising:

receiving, by a controller, from a platoon leader (PL) participating in the platooning, information regarding beam configuration between the PL and a second PM;

determining, by the controller, a beam reception range based on a first receiving direction of the second PM, the first receiving direction being indicated by the information regarding beam configuration;

measuring, by the controller, a signal quality of a first transmission beam of the PL by changing a receiving direction of the first PM within the beam reception range, the first transmission beam being indicated by the information regarding beam configuration; and determining, by the controller, a receiving direction in which the first transmission beam has a best signal quality as a final receiving direction, wherein the second PM is located after the PL, and the first PM is located after the second PM.

13. The operation method according to claim 12, wherein the information regarding beam configuration includes information that indicates the first transmission beam of the PL, information that indicates the first receiving direction of the second PM, and an identifier of a cell to which the PL belongs.

14. The operation method according to claim 12, wherein the information regarding beam configuration is used for beam configuration between the first PM and the PL when at least one of a condition that a cell to which the first PM belongs is equal to a cell to which the PL belongs, a condition that a link quality between the first PM and the PL is higher than a first threshold, a condition that a link quality between the first PM and the second PM is higher than a second threshold, and a condition that a speed of the first PM is equal to or less than a third threshold is satisfied.

15. The operation method according to claim 12, further comprising:

transmitting, by the controller, information that indicates the final receiving direction to the PL; and performing, by the controller, communication with the PL based on the final receiving direction and the first transmission beam.

16. The operation method according to claim 12, further comprising:

transmitting, by the controller, a reference signal to a third PM located after the first PM using a transmission beam equal to the first transmission beam;

receiving, by the controller, from the third PM, information that indicates a final receiving direction of the third PM determined based on the reference signal; and communicating, by the controller, with the third PM based on the first transmission beam and the final receiving direction of the third PM.

17. The operation method according to claim 12, further comprising:

determining, by the controller, a beam transmission range based on the first transmission beam;

transmitting, by the controller, a reference signal to a third PM located after the first PM using a plurality of beams within the beam transmission range;

receiving, by the controller, from the third PM, information that indicates a final transmission beam determined based on the reference signal; and communicating, by the controller, with the third PM based on the final transmission beam and the first receiving direction.

18. An operation method of a first platoon member (PM) participating in platooning in a communication system, comprising:

receiving, by the controller, from a platoon leader (PL) participating in the platooning, information regarding beam configuration between the PL and a second PM;

measuring, by the controller, signal qualities of a plurality of transmission beams of the PL within a beam transmission range determined based on a first transmission beam of the PL in a receiving direction equal to a first receiving direction of the second PM, the first transmission beam and the first receiving direction being indicated by the information on beam configuration; and determining, by the controller, a transmission beam having a best signal quality among the plurality of transmission beams as a final transmission beam, wherein the second PM is located after the PL, and the first PM is located after the second PM.

19. The operation method according to claim 18, further comprising:

transmitting, by the controller, a reference signal to a third PM located after the first PM using a transmission beam equal to the first transmission beam;

receiving, by the controller, from the third PM, information that indicates a final receiving direction of the third PM determined based on the reference signal; and communicating, by the controller, with the third PM based on the first transmission beam and the final receiving direction of the third PM.

20. The operation method according to claim 18, further comprising:

determining, by the controller, a beam transmission range based on the first transmission beam;

transmitting, by the controller, a reference signal to a third PM located after the first PM using a plurality of beams within the beam transmission range;

receiving, by the controller, from the third PM, information that indicates a final transmission beam determined based on the reference signal; and communicating, by the controller, with the third PM based on the final transmission beam and the first receiving direction.

* * * * *